Jan. 31, 1950 C. E. REEVES 2,495,769
DIAL IMPULSE RECORDER
Filed March 3, 1947
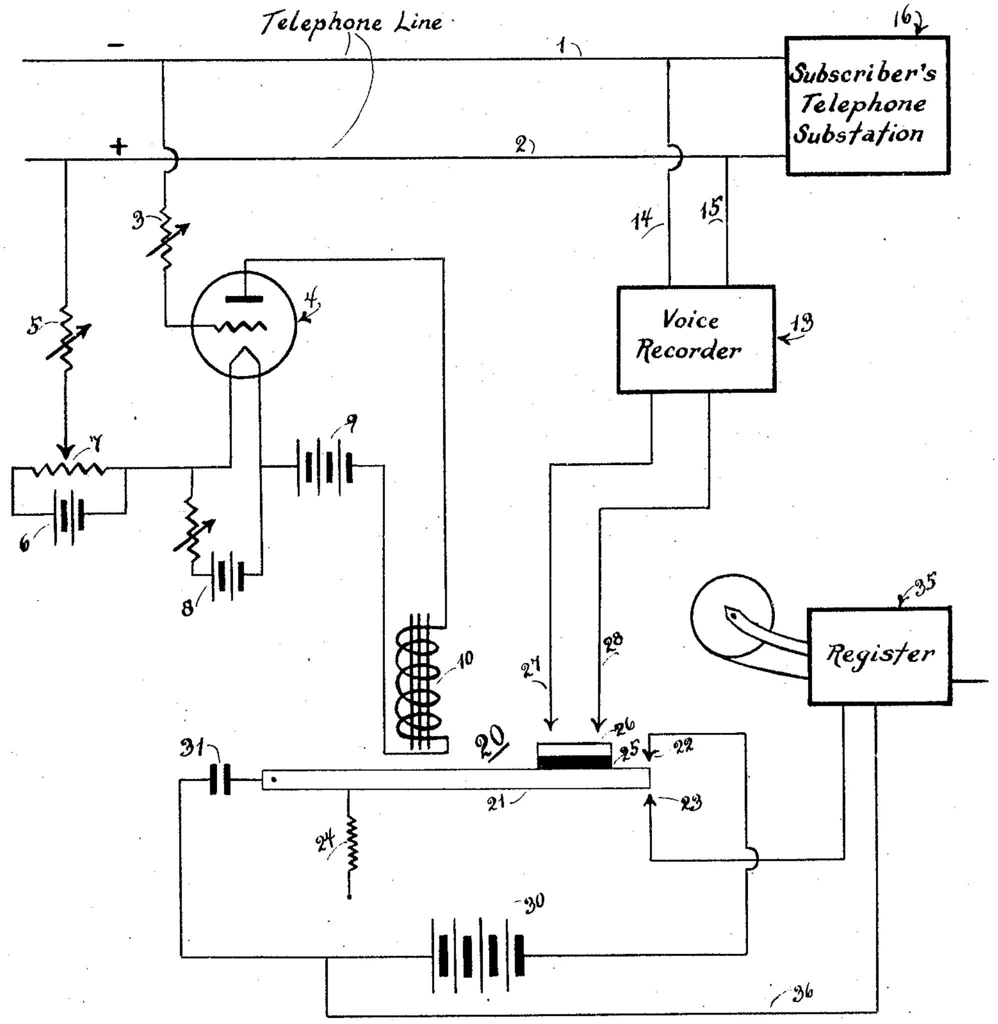
INVENTOR
Clarence E. Reeves
BY J. F. Mothershead
ATTORNEY Patented Jan. 31, 1950 2,495,769

UNITED STATES PATENT OFFICE 2,495,769

DIAL IMPULSE RECORDER

Clarence E. Reeves, Chicago, Ill.

Application March 3, 1947, Serial No. 732,040

7 Claims. (Cl. 179—5.5)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates generally to an impulse recorder and more specifically to a device for recording the dial impulses of an automatic telephone.

It is sometimes desirable to record the called numbers dialed by a certain subscriber's telephone sub-station as well as the conversations therethrough. My Patent No. 2,228,673, discloses a system responsive to the use of a telephone for actuating a voice recorder, or signal. However, since the called number is dialed at the beginning of the use of the calling telephone sub-station and just after the voice recorder is activated, it is possible that the voice recorder may, because of mechanical inertia or delayed heating of electronic filaments, fail to record the initial part, or all of, the dial impulses. Moreover, if all of the dial impulses are recorded by the voice recorder, it is difficult to accurately count the dial impulses as the recording is reproduced.

When the receiver is lifted in a subscriber's automatic telephone sub-station, the subscriber's circuit is closed. When a called number is dialed the closed circuit is intermittently opened, and the number is transmitted to the automatic telephone exchange by the number of times the circuit is opened. To record the number dialed it is necessary, therefore, to record the number of times the circuit is opened. If the recording device were simply energized by the lack of current flow in the telephone lines, the recording device would be energized all the time that the telephone sub-station were not in use.

One of the objects of this invention is to provide a system for recording the dialing impulses originating at a certain subscriber's telephone sub-station.

A further object is to provide a means for recording by visible indicia the impulses dialed by a subscriber's automatic telephone sub-station.

A further object is to provide a system for recording coded series of current interruptions, the system being so arranged that the recording mechanism is energized only during a short period occurring at each current interruption.

It is also an object to provide a system whereby well known and commercially available recording means may be utilized for recording dial impulses from a telephone sub-station.

It is also an object to provide a system whereby a single control unit may actuate a voice recorder when a circuit is closed and an impulse recorder when the circuit is interrupted.

Other and further objects of the invention will be apparent from the following specification when read in connection with the accompanying drawing in which the system is shown diagrammatically.

The drawing is a schematic diagram showing the invention.

In the drawing, wires 1 and 2 are the wires leading from a subscriber's telephone sub-station 16 to the central office. Telephone wire 1 normally has applied thereto a negative potential, while telephone wire 2 has applied thereto a positive potential. Wire 1 is connected by way of resistance 3 to the grid of triode 4. Wire 2 is connected by means of a resistance 5 and a source of biasing potential 6, with potentiometer winding 7 thereacross, to the cathode of the tube 4. The cathode of the tube 4 is energized by the battery 8 or other appropriate source of cathode potential. The plate or anode of the tube 4 is connected to one terminal of the winding 10 of an electromagnetic relay designated generally at 20, the other terminal of which winding is connected to the positive side of a source of anode potential 9, the negative side of which is connected to the cathode of the tube 4.

The electromagnetic relay 20 is also provided with an armature 21 which engages with contact 22 when winding 10 is energized and with contact 23 when winding 10 is not energized. Fixed to armature 21, and insulated therefrom by insulating material 25, is connecting bar 26. When relay 10 is energized connecting bar 26 engages contacts 27 and 28 to close the actuating circuit of the voice recorder 13. The recording circuit of recorder 13 is connected to wires 1 and 2 of the telephone line by wires 14 and 15, respectively. Contact 22 is connected in series through battery 30 and condenser 31 to armature 21. The terminal of condenser 31 not connected to armature 21 is connected to a registering device 35 through line 36. Contact 23 is also connected to said registering device 35.

Registering device 35 is a device known commercially as a fire alarm register. Such a device, as shown in Patents 633,982 and 691,587, is arranged with a recording tape and a marking means which may be punching means, inking means, or other indicia producing means. The register operates so that an applied electrical pulse causes the recording means to place visible indicia on the tape and at the same time stores energy in the tape moving mechanism so that the tape is moved a short distance after the indicia are recorded. If the pulses follow each other in rapid sequence a second pulse following a first pulse is recorded on the tape before the tape has stopped moving and the indicia are relatively closely spaced on the tape. However, if there is a short pause between two pulses the tape moves during the pause and the succeeding indicia are spaced a relatively long distance from the preceding one. Spaced series of pulses are therefore accurately recorded in proper spaced relation on the tape and may be examined at any time after recording.

The voltage across a line such as 1—2 leading to a subscriber's telephone station is substantially higher when the line is idle and open than when the line is in use and the circuit is closed. The voltage immediately drops when the circuit is closed by the raising of the receiver and remains at that value during conversations until the circuit is opened by the replacing of the receiver. However, when a number is dialed the circuit is intermittently opened causing the voltage to alternately raise and fall.

During such time as there exists across the telephone line 1—2 the normal idle line relatively high voltage the grid or control electrode of the tube 4 is biased to such a point that no current flows in the plate circuit of the tube and consequently the winding 10 of the electromagnetic relay is not energized. When the circuit is closed at the subscriber's sub-station, by either lifting the receiver or the act of dialing, the voltage between wires 1 and 2 drops and the reduced line voltage is insufficient to maintain the grid of tube 4 sufficiently negative to prevent plate current flow. The reduced line voltage caused by closing the subscriber's circuit permits the plate current to flow, energizing winding 10 of electromagnetic relay 20.

When winding 10 is energized the armature 21 is attracted to bring connecting bar 26 into engagement with contacts 27 and 28 thus energizing the voice recorder. Also upon the energizing of winding 10 armature 21 is brought into engagement with contact 22 thus charging condenser 31 by battery 30. When winding 10 is not energized armature 21 is pulled by spring 24 out of engagement with contact 22 and into engagement with contact 23 thus discharging condenser 31 through register 35. Also, when winding 10 is deenergized, connecting bar 26 breaks the circuit between wires 27 and 28, stopping the operation of voice recorder 13.

When the subscriber's substation 16 is idle, no current flows in the plate circuit of tube 4, and electromagnetic relay 20 is not energized. In this condition voice recorder 13 does not operate. When the receiver is lifted, plate current flows in tube 4, electromagnetic relay 20 is energized, voice recorder 13 operates and condenser 31 is charged by battery 30 from which only sufficient current can flow to charge condenser 31. The length of time the line 1—2 is in use, or closed, beyond the very short changing time of the condenser does not cause further drain of the battery 30. Each dial impulse, or opening of the circuit, deenergizes electromagnetic relay 20 and causes condenser 31 to be discharged to apply an operating pulse to register 35. Between dial pulses, the circuit is closed and condenser 31 is recharged. A mark is thus made on the tape of register 35 for each time the circuit is opened by the act of dialing. During such time as the telephone substation 16 is in use the recorder continues to function to record the conversation on the line. Upon replacement of the receiver at the subscriber's sub-station 16 the normal voltage of the line again charges the grid of vacuum tube 4 sufficiently negative as to stop plate current and release the armature 21, opening the circuit 27—28 and stopping operation of the voice recorder.

Resistors 3 and 5 are provided with adjustment so that they may be readily adapted for use with any subscriber's line. It will be obvious that a signal device could be inserted along with or in place of voice recorder 13 and that this invention could be used wherever it is desired to record impulses. It will also be understood that the above-described embodiment of this invention is the preferred form but that many modifications thereof will occur to those skilled in the art within the scope of the appended claims.

The invention claimed is:

1. In combination with a telephone subscriber's line, a relay comprising a thermionic tube having a cathode, anode and a control electrode, means including a resistance connecting the negative side of said subscriber's line to the control electrode of said tube, means connecting the positive side of said subscriber's line to the cathode of said tube, a source of anode potential for the tube, an electromagnetic relay, said relay having an electromagnet, means connecting said source of anode potential and said electromagnet between the cathode and anode of said tube, said electromagnetic relay also having a first contact which engages a second contact when said relay is energized and which engages a third contact when said relay is deenergized, a condenser, one side of which is connected to said first contact and the other side of which is connected to one terminal of a source of potential, the other terminal of which source is connected to said second contact, an electrically operated impulse recorder, means connecting said other side of said condenser and said third contact to said impulse recorder whereby when said telephone line has a relatively low potential thereacross the relay is energized to charge said condenser and when said telephone line has a relatively high potential thereacross said relay is deenergized to discharge said condenser through said impulse recorder.

2. The combination of claim 1, including a voice recorder, said electromagnetic relay including a circuit opening and closing device, whereby existence of a relatively low potential across said line energizes said relay and operates said voice recorder and existence of a relatively high potential across said line deenergizes said relay and said voice recorder.

3. In a device adapted to be connected to an impulse recorder and a telephone subscriber's line having a positively and a negatively polarized wire, a thermionic tube including at least a cathode, control grid and an anode, means for connecting said cathode and control grid to said positive and negative wires respectively, an electromagnetic relay and a source of anode potential connected in series between said anode and cathode, said electromagnetic relay having a first contact which engages a second contact when the electromagnetic relay is energized and which engages a third contact when the electromagnetic relay is unenergized, a condenser, one side of which is connected to said first contact and the other side of which is connected to one terminal of a source of potential, the other terminal of which source is connected to said second contact, means for connecting said other side of said condenser and said third contact to said impulse recording means.

4. The combination of claim 3 in which said electromagnetic relay also includes a device to close an auxiliary circuit when said electromagnetic relay is energized and which opens said circuit when said electromagnet is deenergized.

5. In a device adapted to record impulses from a dial telephone, a telephone subscriber's line and a relay means connected to said line and energized when the transmission of a dial pulse causes an increase of voltage in said line, a condenser and a source of charging potential, means operating to connect said source of potential across said condenser when said relay means is not energized, an impulse recorder operated by the application thereto of an electrical pulse, and means to connect said condenser across said impulse recorder when said relay means is energized.

6. The combination of claim 5 in which there is a voice recorder and in which there is additional means operated by said relay means to energize said voice recorder when said relay means is energized.

7. In a device adapted to be connected to an impulse recorder, a voice recorder, and a telephone subscriber's line, an electromagnetic relay having a first contact which engages a second contact when the relay is energized and which engages a third contact when the relay is deenergized, a condenser, one side of which is connected to said first contact and the other side of which is connected to one terminal of a source of potential, the outer terminal of which source is connected to said second contact, means for connecting said other side of said condenser and said third contact to said impulse recording means, fourth and fifth contacts associated with said relay and adapted for connection in the energizing circuit of the voice recorder, means on said relay to connect said fourth and fifth contacts when said relay is energized, energizing means for said relay adapted for connection to said subscriber's line.

CLARENCE E. REEVES.

REFERENCES CITED

The following references are of record in the file of this patent:

UNITED STATES PATENTS

| Number | Name | Date |
|---|---|---|
| 1,579,046 | Miller | Mar. 16, 1926 |
| 2,115,917 | Shanck | May 3, 1938 |